(12) United States Patent
Dementjev et al.

(10) Patent No.: US 8,758,473 B2
(45) Date of Patent: Jun. 24, 2014

(54) PROCESS OF MANUFACTURING OF BIOLOGICALLY ACTIVE HUMIC PRODUCTS

(76) Inventors: Vladimir Dementjev, Babites (LV); Olegs Brazko, Ogre (LV)

( * ) Notice: Subject to any disclaimer, the term of this patent is extended or adjusted under 35 U.S.C. 154(b) by 108 days.

(21) Appl. No.: 13/433,475

(22) Filed: Mar. 29, 2012

(65) Prior Publication Data

US 2012/0272701 A1 Nov. 1, 2012

(51) Int. Cl.
*C05F 11/02* (2006.01)
(52) U.S. Cl.
USPC .................................................. 71/24
(58) Field of Classification Search
USPC ............................................. 71/24
See application file for complete search history.

(56) References Cited

U.S. PATENT DOCUMENTS

| | | | |
|---|---|---|---|
| 3,307,934 A * | 3/1967 | Palmer et al. | 71/24 |
| 3,321,296 A * | 5/1967 | Abbe | 71/24 |
| 3,573,892 A * | 4/1971 | Atkins et al. | 71/24 |
| 6,287,496 B1 * | 9/2001 | Lownds | 264/118 |
| 7,204,660 B2 | 4/2007 | Shulgin et al. | |
| 2010/0251790 A1 * | 10/2010 | Van Rooijen et al. | 71/24 |

* cited by examiner

*Primary Examiner* — Wayne Langel

(57) ABSTRACT

The present invention is directed to peat processing and includes the usage of peat as the organic raw material. The peat is processed through preliminary granulation with further curing of the derived granules in closed tanks for cooling. The cooled granules are subjected to re-granulation. Then the hot granules derived from re-granulation emerge into an aqueous solution. The derived mixture is stirred until it turns into a homogeneous viscous fluid paste. The paste is supplemented with alkali until the pH reaches the value of 10-10.5. The final product results after cooling of the paste to ambient air temperature.

10 Claims, 1 Drawing Sheet

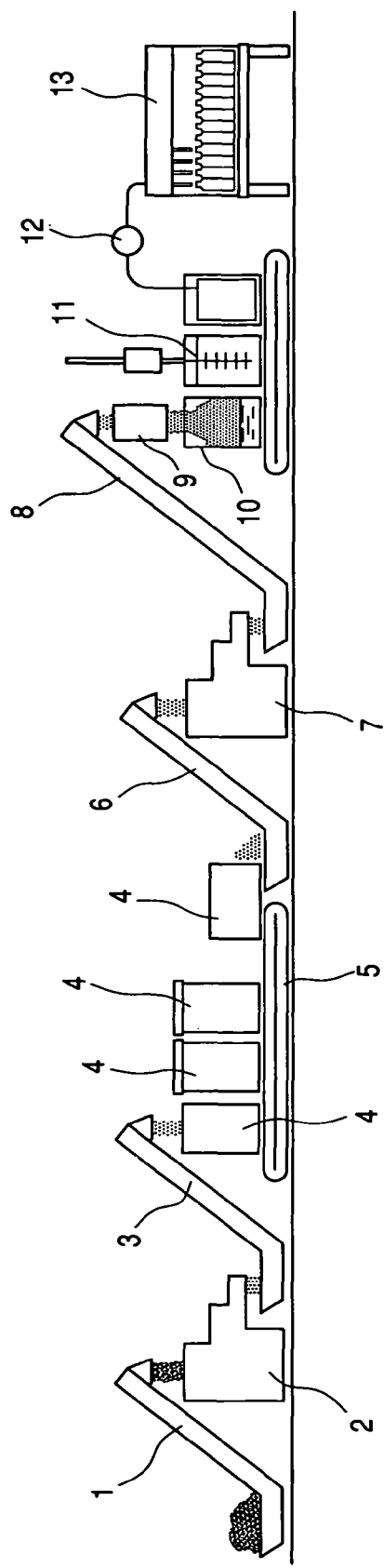

PROCESS OF MANUFACTURING OF BIOLOGICALLY ACTIVE HUMIC PRODUCTS

This application claims the benefit pursuant to 35 USC 119 of Russian patent application 2011112692, filed Apr. 4, 2011, the entire contents of which are hereby incorporated by reference in its entirety.

Process of Manufacturing of Boilogically Active Humic Product

The innovation refers to the technology of peat processing and can be used for the derivation of biologically active humic products usable, particularly, in agriculture.
There is a known method of DERIVATION OF HUMIC SUBSTANCES FOR RESTORING TECHNOGENICALLY CONTAMINATED LAND, SOIL, WATER described in Patent RU 2242447. The method includes fragmentation of an organic raw material in order to make it homogeneous and feeding into a blending tank together with water. The organic raw material prior to fragmentation subjects to screening from foreign matters, stones, inclusions, and a hydraulic percussive rotary device is used as a blending tank. The weight relation between the organic raw material and water makes up 1:5, which results in low concentration of humic substances and low resistance of the derived humic solution.

The closest analogue of the claimed invention refers to the derivation of a humic—mineral reagent described in Patent RU 2233293. The method includes fragmentation and screening of an organic raw material, its processing and derivation of a final product. In the described method the output of humic acids in the final product makes up 4%, 6% to the maximum, but the derived for application humic acid aqueous suspension appears instable, quickly disintegrates in aqueous suspension, loses effective concentration, as a result its application in agriculture as a plant growth promoter watering preparation becomes encumbered.

The common disadvantage of the known methods is the low concentration of humic acids in the final product, as well as a complicated technology of derivation of the final product.

The task of the claimed innovation implies the development of a simple technology of derivation of a humic product that enables to yield a highly active humic product with the elevated concentration of humic substances.

A technical result refers to the elevation of concentration of biologically active humic substances in the final product and simplification of the technology of its manufacturing.

The aforesaid can be achieved thanks to the fact that in the known method the derivation of a biologically active humic product, which includes fragmentation and screening of an organic raw material, its processing and derivation of the final product, pursuant to the innovation, implies the usage of peat as the organic raw material, which moisture is close to natural one, where the peat processing is executed through its preliminary granulation with the further curing of the granules during 12 hours, thereafter the cooled granules subject to re-granulation to derive granules, which diameter is smaller than the diameter of the granules derived after the preliminary granulation, then the derived after the re-granulation hot granules are poured into an aqueous solution, the derived mixture is stirred with a submerged mixer until it turns into a homogeneous viscous fluid paste, then alkali is added to the derived paste until pH reaches the value 10÷10.5, but the final product is yielded after the derived paste cools down to the ambient air temperature. Moreover, the preliminary granulation is executed with derivation of granules with the diameter of 5 mm, but the re-granulation—with derivation of granules with the diameter of 3 mm.

The FIGURE depicts a processing line for the derivation of a humic product according to the claimed method.

The method includes fragmentation and screening an organic raw material, processing with further derivation of a final product. As the organic raw material the method anticipates the use of peat with moisture close to natural. The peat is processed through its fragmentation and screening. The derived screened peat is treated through preliminary granulation with derivation of granules with the diameter of 5 mm and further curing of the derived granules during 12 hours. Thereafter the cooled granules subject to re-granulation with yielding of granules, which diameter equals to 3 mm Then hot granules derived after re-granulation are poured into an aqueous solution in the ratio 6:4 and stirred with a submerged mixer. A bigger quantity of the aqueous solution results in a more fluid, but less viscous paste, but a bigger quantity of granules results in a more viscous, but less fluid paste, which in either of the said methods creates certain difficulties during pouring of the paste into package. At the given ratio of the components during stirring with a submerged mixer there develops a viscous fluid paste. The derived paste is supplemented factionary with alkali, for instance, with potassium hydroxide until pH reaches the value 10÷10.5. The final product is yielded after the derived paste cools down to the ambient air temperature.

The offered method is executed with the help of the processing line shown on the FIGURE. The processing line, which ensures derivation of a humic product, includes: a feed conveyor 1, a granulator 2 (e.g., a well-known matrix ОМГ-1,5) preliminary granulation to derive peat granules with the diameter of 5 mm, a feed conveyor 3, a closable tank 4, a transporter 5, a feed conveyor 6, a granulator 7, re-granulation to derive granules with the diameter of 3 mm, a feed conveyor 8, a dosing unit 9, a measuring tank 10 with an aqueous solution, a submerged mixer 11, a transit pump 12, a pouring line 13. Devices used for peat fragmentation and screening before its preliminary granulation are not shown in the FIGURE.

The method is executed as following.

After peat extraction, the peat of natural moisture is fragmented and screened. The screened fine peat with the moisture close to natural, because peat during fragmentation and screening loses a small percent of moisture, with the help of the feed conveyor 1 is loaded into the granulator 2 with the matrix ensuring derivation of granules with the diameter of 5 mm for the primary granulation. During granulation small particles of peat in the granulator 2 are exposed to strong compression, deformations and destruction through a shift in the matrix of the granulator. As a result of such impact on raw material the distance between the peat particles in a granule is significantly decreases, the dispersive component of peat sharply changes, i.e., the ratio of bound and free water, the density of a peat granule through compression increases 5-6 times if compared to the loaded peat. Simultaneously with the peat compression the pressure is transferred also onto water contained in the peat, as a result the water molecules from the areas of bigger saturation penetrate into the areas of less saturation, re-distribute in the peat pores and evenly moisten it. At the same time there occurs elimination of a large quantity of heat through overcoming force of friction developed between the granules and the walls of the granulator's matrix channels, as a result the peat in the granules sickens and is heated up to 70-80° C. As a result of the primary peat granulation hot peat granules of Ø 5 mm come out from the granulator 2, which with the help of the feed conveyor 4 are loaded into the closable tank 5, where the granules slowly cool down during 12 hours. The impact on the peat of elevated temperatures during its cooling in the closable tanks activates weak acid hydrolysis of the peat thanks to densification of hydrogen ions as a result of dissociation of the peat free acids, which occurs only at elevated temperatures. After 12 hours of cooling the tank 5 is opened and the cooled granules with the help of the feed conveyor 6 are loaded into the granulator 7 for the secondary granulation. The diameter of the matrix of the secondary granulator 7 equals to 3 mm, as a result the granules derived from the preliminary granulation are exposed to shifting, destruction, stronger compression, and as a result of the said processes, to heating up to 80° C. Through the double staged granulation there occurs a mechanical and chemical activation of the peat, i.e., changing of the peat compositional structure through reduction of the length of the molecular chains, including humic acids with expansion in the number of hygrophilous components, and physically and chemically bound water. The granulation operations manifest a technological stage of derivation of the final product. Further with the help of the feed conveyor 8 the hot granules derived during the re-granulation are supplied through the dosing unit 9 into the measuring tank 10 with an aqueous solution. After loading of the hot granules into the aqueous solution with the help of the submerged mixer 11 at revolutions of 1500 rmp there occurs mechanical and chemical activation of the peat during 15-20 min. Further, at the operating mixer the prepared homogeneous peat mixture is gradually supplemented with alkali until pH becomes 10÷10.5. Stirring at 1500 rmp is performed during 30-45 min. Activation of chemical processes at this stage occurs through a cavitation effect and high density of the peat mixture. Further the peat mixture is supplemented with water at the rate of 10-15% of the total volume of the mixture with further stirring during 10 min.

After cooling of the derived paste down to the ambient air temperature the paste with the help of the vacuum pump is poured into package.

The offered method simplifies the technological process of derivation of a biologically active humic product and raises the content of humic acids therein up to 12-13% (120-130 mg/kg), which cannot be attained by the known methods, at which the concentration of humic acids does not exceed, as a rule, 4-6%.

What is claimed is:

1. A method of production of a biologically active humic product comprising the steps of:
   (i) providing a starting material comprising peat having a moisture content substantially that of naturally occurring peat;
   (ii) preliminarily granulating said starting material in order to produce granules having a diameter less than that of the starting material;
   (iii) curing said granules from step (ii) in a closed tank;
   (iv) cooling said cured granules in said closed tank;
   (v) combining said cooled granules from step (iv) with an aqueous solution;
   (vi) re-granulating said cured granules in said aqueous solution from step (v) to reduce the diameter of said cured granules to less than the diameter of the granules of step (ii);
   (vii) stirring said aqueous solution containing said re-granulated granules of step (vi) to form a homogeneous viscous fluid paste;
   (viii) adjusting the pH of said fluid paste of step (vii) to a pH in the range of from 10 to 10.5; and
   (ix) cooling said paste from step (viii).

2. The method of claim 1 wherein said pH is adjusted in step (viii) by the addition of an alkali.

3. The method of claim 2 wherein said alkali is potassium hydroxide.

4. The method of claim 1 wherein said paste of step (ix) is cooled to ambient temperature.

5. The method of claim 1 wherein said aqueous solution containing said granules of step (vii) is stirred by means of a submerged mixer.

6. The method of claim 1 wherein said granules are cured for 12 hours.

7. The method of claim 1 wherein said starting material is granulated to a size of 5 mm.

8. The method of claim 1 wherein said re-granulated granules have a size of 3 mm.

9. The method of claim 1 wherein said product of step (ix) has a humic acid content of from 12 to 13% by wt.

10. The method of claim 1 wherein said starting material is granulated to a size of 5 mm, and said re-granulated granules have a size of 3 mm.

* * * * *